(12) United States Patent
Kondo et al.

(10) Patent No.: US 8,616,774 B2
(45) Date of Patent: Dec. 31, 2013

(54) SLIDING BEARING

(75) Inventors: Masaru Kondo, Toyota (JP); Kenji Watanabe, Toyota (JP); Yukiyasu Taguchi, Toyota (JP)

(73) Assignee: Taiho Kogyo Co., Ltd., Toyota-shi, Aichi (JP)

(*) Notice: Subject to any disclaimer, the term of this patent is extended or adjusted under 35 U.S.C. 154(b) by 0 days.

(21) Appl. No.: 13/502,631

(22) PCT Filed: Oct. 4, 2010

(86) PCT No.: PCT/JP2010/067363
§ 371 (c)(1),
(2), (4) Date: Apr. 18, 2012

(87) PCT Pub. No.: WO2011/052345
PCT Pub. Date: May 5, 2011

(65) Prior Publication Data
US 2012/0201485 A1    Aug. 9, 2012

(30) Foreign Application Priority Data

Oct. 30, 2009   (JP) .................................. 2009-250984

(51) Int. Cl.
*F16C 33/10* (2006.01)
(52) U.S. Cl.
USPC .......................................... 384/288; 384/283
(58) Field of Classification Search
USPC ......... 384/288, 276, 283, 284, 286, 291, 294, 384/292, 429
See application file for complete search history.

(56) References Cited

U.S. PATENT DOCUMENTS 6,494,621 B2 * 12/2002 Markovitch .................. 384/292
2003/0190101 A1 * 10/2003 Horng et al. ................. 384/278

FOREIGN PATENT DOCUMENTS

| JP | 58-046805 | | 3/1983 | |
| JP | 02-116028 | | 9/1990 | |
| JP | 05-202936 | | 8/1993 | |
| JP | 09144750 | * | 6/1997 | ............. F16C 17/03 |
| JP | 2002-286027 | | 10/2002 | |
| JP | 2005069283 | * | 3/2005 | ............... F16C 9/02 |
| JP | 2006-144913 | | 6/2006 | |
| JP | 2006258194 A | * | 9/2006 | ............... F16C 7/02 |
| JP | 2009-174697 | | 8/2009 | |
| WO | WO 2007122798 | * | 11/2007 | ............. F16C 33/10 |

OTHER PUBLICATIONS

Machine translation of JP 2005-069283.*
Machine Translation of JP 2006-258194.*

(Continued)

*Primary Examiner* — Thomas R Hannon
*Assistant Examiner* — Yamilka Pinero Medina
(74) *Attorney, Agent, or Firm* — Flynn, Thiel, Boutell & Tanis, P.C.

(57) ABSTRACT

A sliding bearing 1 is formed into a cylindrical shape by placing abutting surfaces 11A and 12A of a pair of half-bearings 11 and 12 so as to abut against each other. Two foreign substance discharging grooves 5 and 5' inclined with respect to an axial direction of the sliding bearing 1 are formed on a sliding surface 3 adjacent to an inner circumferential edge 4 of the abutting surfaces 11A and 12A. When a lubricant is supplied to the sliding surface 3, a foreign substance 6 mixed in the lubricant is trapped by foreign substance discharging grooves 5 and 5' and then discharged out of the sliding bearing 1 from ends 5A and 5B (5A' and 5B') open to end faces 7 and 8.

9 Claims, 7 Drawing Sheets

(56) References Cited

OTHER PUBLICATIONS

Machine Translation of JP 09-144750.*

Machine Translation of JP 05-202936.*

International Search Report for PCT/JP2010/067363 (1 page).

* cited by examiner

SLIDING BEARING

TECHNICAL FIELD

The present invention relates to a sliding bearing, and more particularly, to a sliding bearing configured into a cylindrical shape with a pair of half-bearings placed so as to abut against each other.

BACKGROUND ART

Conventionally, a sliding bearing is known which is configured into a cylindrical shape with a pair of half-bearings placed abutting against each other, and provided with a chamfer part and a crush relief in an inner circumferential part of each of the abutting surfaces of the half-bearings (see FIG. 7). In such a sliding bearing provided with a crush relief as a notch, when a lubricant is supplied from an oil hole of a crank shaft as shown in FIG. 7, a foreign substance mixed in the lubricant is trapped by the crush relief and then discharged to the outside through the crush relief and openings on both sides of the chamfer part.

Conventionally, a sliding bearing is proposed in which a foreign substance discharging groove is formed at a required location of the sliding surface so as to trap and discharge the foreign substance mixed in the lubricant (e.g., Patent Literature 1 to Patent Literature 4).

In the sliding bearing of Patent Literature 1, an oil groove is provided over the entire area in the circumferential direction of the sliding surface of the lower half-bearing and a pair of foreign substance discharging grooves are formed which are branched from the oil groove and open to both end faces in the axial direction of the half-bearing.

Furthermore, the sliding bearing of Patent Literature 2 is configured such that the axis of rotation is axially supported by a plurality of arc-shaped pads, a T-shaped groove is formed on the sliding surface of each arc-shaped pad to trap a foreign substance and a magnet is set up at the bottom of the axial direction groove in the T-shaped groove. The magnet is intended to attract and trap the foreign substance in the axial direction groove.

Furthermore, in the sliding bearing of Patent Literature 3, a plurality of rectilinear foreign substance discharging grooves are formed along the axial direction in the vicinity of the abutting surface of the lower half-bearing.

Furthermore, in the sliding bearing of Patent Literature 4, an axial direction groove having a triangular cross section is provided at an inner edge of the abutting surface of the half-bearing and a circumferential direction groove is formed adjacent to the axial direction groove within a predetermined range of the sliding surface.

PRIOR ART DOCUMENTS

Patent Literature

Patent Literature 1: Japanese Utility Model Laid-Open No. 02-116028
Patent Literature 2: Japanese Utility Model Laid-Open No. 58-046805
Patent Literature 3: Japanese Patent Laid-Open No. 5-202936
Patent Literature 4: Japanese Patent Laid-Open No. 2009-174697

SUMMARY OF THE INVENTION

Problems to be Solved by the Invention

However, the sliding bearings disclosed in aforementioned Patent Literature 1 to Patent Literature 4 have the following problems.

That is, in the sliding bearing of Patent Literature 1, since the oil groove is provided over the entire area in the circumferential direction of the sliding surface of the half-bearing and the foreign substance discharging groove is branched therefrom, the foreign substance is likely to circulate in the oil groove, making it difficult for the foreign substance discharging groove to reliably trap the foreign substance, which leads to a disadvantage that the foreign substance can hardly be discharged efficiently.

Furthermore, in the sliding bearing of Patent Literature 2, the T-shaped groove is formed in the center of the sliding surface of the arc-shaped pad, which results in the reduced area of the entire sliding surface, leading to a problem that the load capacity of the sliding bearing decreases.

Furthermore, in the sliding bearing of Patent Literature 3, a plurality of axial direction grooves for discharging a foreign substance are only formed in the lower half-bearing on which a load is imposed, resulting in a disadvantage that the foreign substance can hardly be discharged efficiently.

Furthermore, in the sliding bearing of Patent Literature 4, the foreign substance trapped by the circumferential direction groove is discharged via the axial direction groove, resulting in a disadvantage that the foreign substance can hardly be discharged efficiently.

Means for Solving the Problems

In view of the aforementioned circumstances, the present invention provides a sliding bearing which is formed into a cylindrical shape by placing abutting surfaces of an upper half-bearing and a lower half-bearing so as to abut against each other and rotatably support an axis of rotation by a sliding surface made of inner surfaces of both half-bearings, wherein a foreign substance discharging groove, an end of which is open to at least one of the end faces in an axial direction, is formed on the sliding surface adjacent to an inner circumferential edge of the abutting surface of at least one of the upper and lower half-bearings by being tilted with respect to the axial direction of the sliding bearing.

Advantageous Effects of Invention

In such a configuration, foreign substances included in the lubricant are trapped in the above-described foreign substance discharging groove and discharged out of the sliding bearing via the tilted foreign substance discharging groove as the axis of rotation rotates. Therefore, it is possible to provide a sliding bearing of better foreign substance discharging characteristics compared to the prior arts.

MODE FOR CARRYING OUT THE INVENTION

Figure 1:
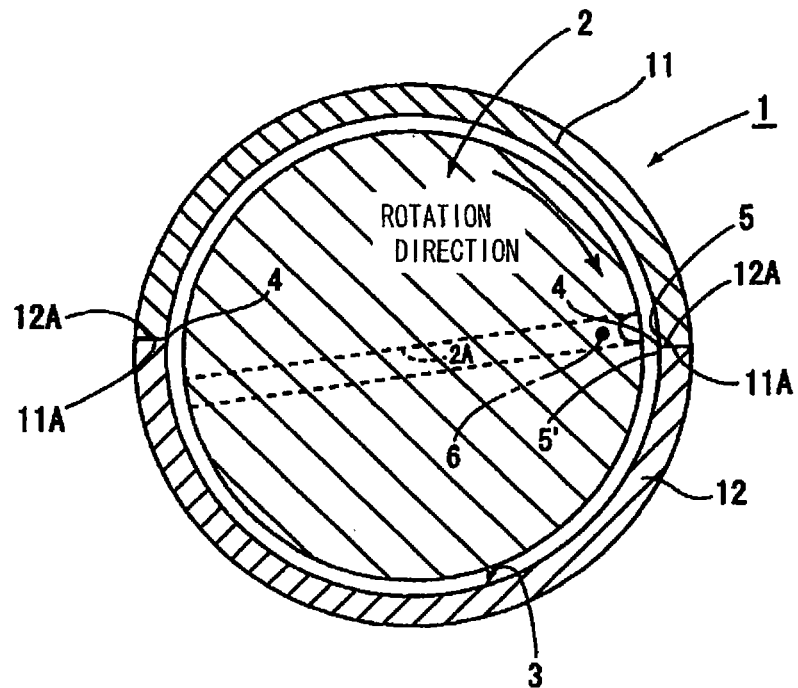
FIG. 1 is a cross-sectional view of a sliding bearing and a crank pin illustrating an embodiment of the present invention.
Figure 2:
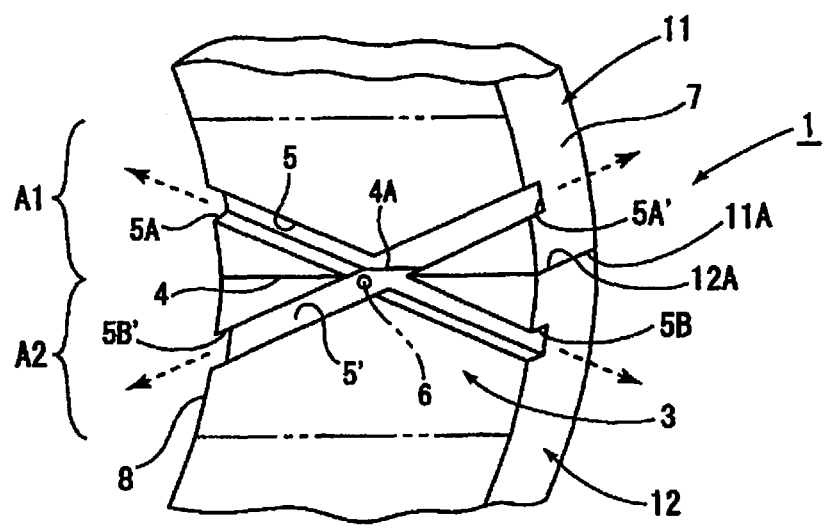
FIG. 2 is an enlarged perspective view of main parts on one side of the sliding bearing shown in FIG. 1.

Hereinafter, the present invention will be described with embodiments illustrated in the accompanying drawings. In FIG. 1 and FIG. 2, reference numeral 1 denotes a sliding bearing provided on a connecting rod (not shown). This sliding bearing 1 is made up of a pair of upper and lower semi-cylindrical half-bearings 11 and 12, and is configured into a cylindrical shape as a whole by causing abutting surfaces 11A and 12A of both half-bearings 11 and 12 to abut against each other. This sliding bearing 1 pivotably supports a crank pin 2 (axis of rotation) of the crank shaft with a sliding surface 3 which is an inner surface of both half-bearings 11 and 12.

When a lubricant is discharged from an oil pump (not shown) to the crank shaft, the lubricant is supplied into a lubricant passage (not shown) provided in the crank shaft and a lubricant supply hole 2A of the crank pin 2 connected thereto. The lubricant supplied into this lubricant supply hole 2A is supplied to the sliding surface 3 which is the inner surface of both half-bearings 11 and 12 as the crank pin 2 rotates in a direction shown by an arrow (clockwise direction in FIG. 1). This causes the sliding surface 3 of the sliding bearing 1 to be lubricated.

The present embodiment provides foreign substance discharging grooves 5 and 5' in an inner circumferential edge 4 of the abutting surfaces 11A and 12A and in the sliding surface 3 adjacent thereto so that the foreign substance discharging grooves 5 and 5' may trap a foreign substance 6 mixed in the lubricant and discharge the foreign substance 6 out of the sliding surface 3.

That is, as shown in FIG. 2, two rectilinear grooves are formed so as to cross each other in the sliding surface 3 adjacent to the inner circumferential edge 4 of the abutting surfaces 11A and 12A, which are on sides of the sliding bearing 1. One of the rectilinear grooves constitutes the first foreign substance discharging groove 5 and the other rectilinear groove constitutes the second foreign substance discharging groove 5'.

The widths and depths of both foreign substance discharging grooves 5 and 5' are set to be identical and both foreign substance discharging grooves 5 and 5' are arranged, inclined with respect to the axial direction of the sliding bearing 1 so as to cross each other at a central part 4A in the axial direction of the inner circumferential edge 4. That is, the two foreign substance discharging grooves 5 and 5' that cross each other are formed over the sliding surface 3 of the upper and lower half-bearings 11 and 12 centered on the inner circumferential edge 4.

Figure 4:
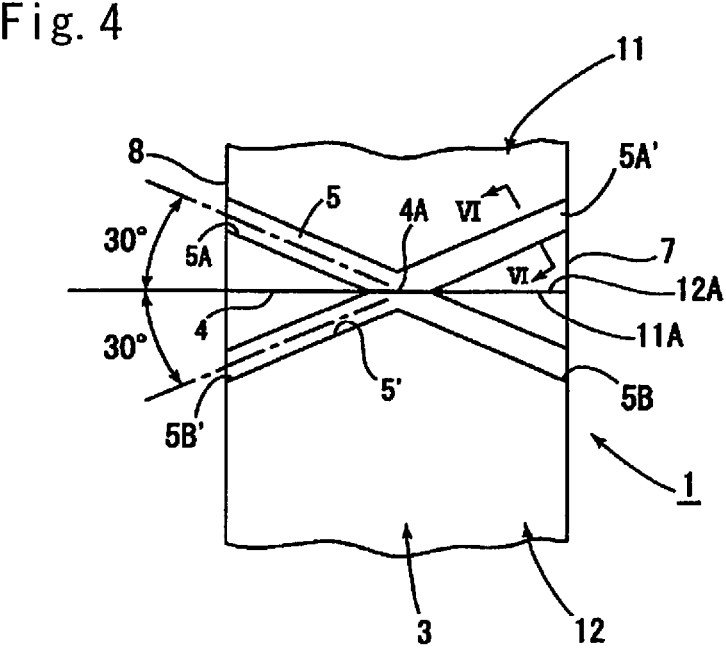
FIG. 4 is a front view of the main parts illustrating a range of setting the foreign substance discharging groove shown in FIG. 2.

An end 5A of the first foreign substance discharging groove 5 on the upstream side of the rotation direction is open to one end face 8 of the upper half-bearing 11 in the axial direction and an end 5B of the foreign substance discharging groove 5 on the downstream side of the rotation direction is open to the other end face 7 of the lower half-bearing 12 (see FIG. 2 and FIG. 4). An end 5A' of the second foreign substance discharging groove 5' on the upstream side of the rotation direction is open to an end face 7 of the upper half-bearing 11 and an end 5B' which is the downstream side in the rotation direction of the foreign substance discharging groove 5' is open to the end face 8 of the lower half-bearing 12.

Figure 6:
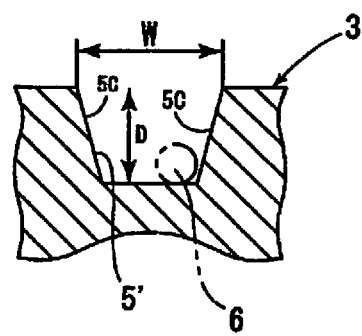
FIG. 6 is a cross-sectional view of the main parts along line VI-VI in FIG. 4.
Figure 7:
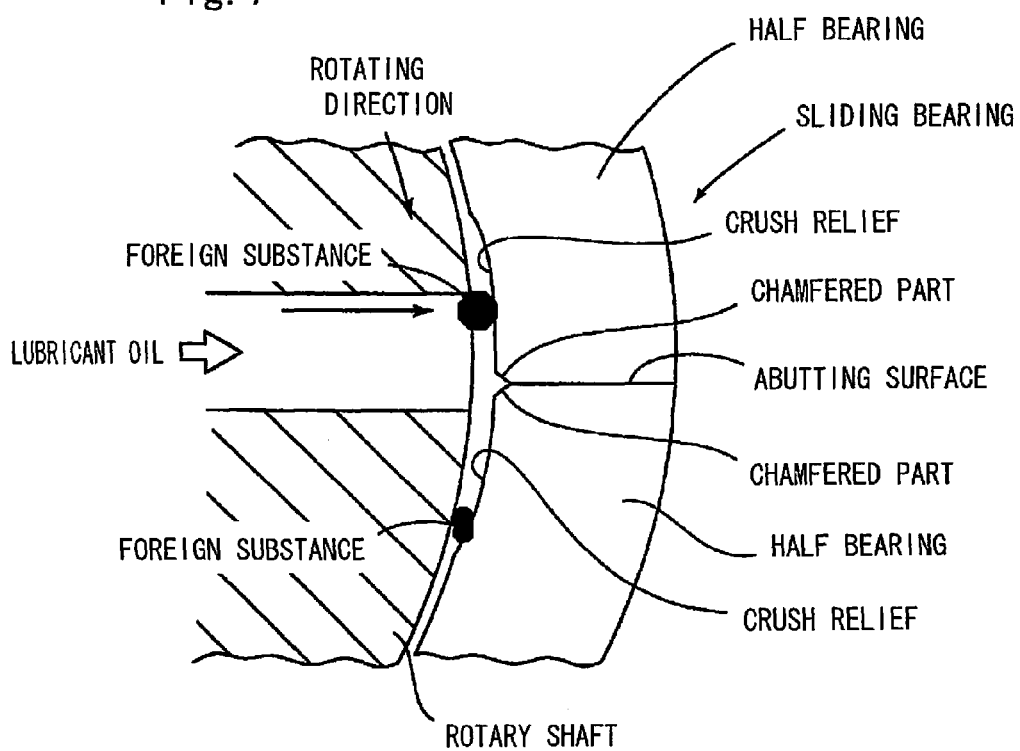
FIG. 7 is a front view illustrating main parts of a conventional sliding bearing.

Thus, the foreign substance discharging grooves 5 and 5' are formed such that the ends 5A and 5B (5A' and 5B') are open to the end faces 7 and 8 in the axial direction of the sliding bearing 1 via the central part 4A of the inner circumferential edge 4 in the axial direction. The width W and depth D of both foreign substance discharging grooves 5 and 5' are set to dimensions enough to accommodate and allow to pass the foreign substance 6 of a maximum estimated size. As shown in an enlarged view in FIG. 6, both foreign substance discharging grooves 5 and 5' have a trapezoidal cross-sectional shape with the width W being slightly greater than the depth D. Furthermore, as shown in this FIG. 6, since both foreign substance discharging grooves 5 and 5' have a trapezoidal cross section which gradually expands from the bottom to the opening at the top end, right and left side walls 5C and 5C constitute inclined surfaces, inclined with respect to the neighboring sliding surface 3.

Figure 5:
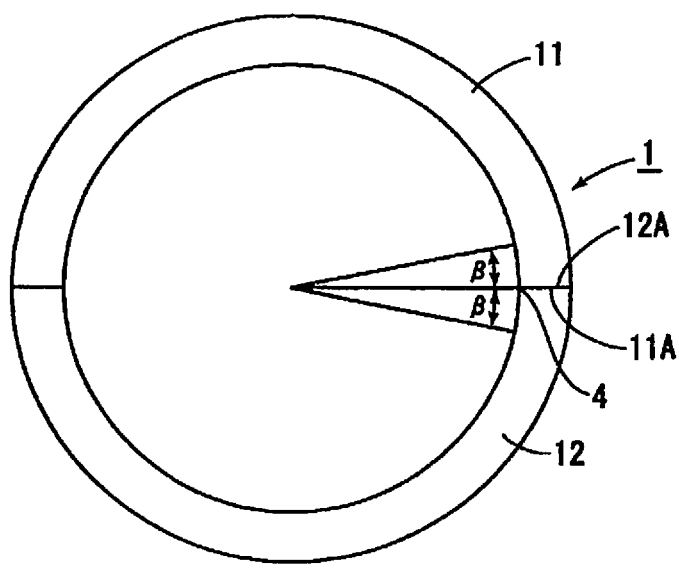
FIG. 5 is a diagram illustrating the setting range in the circumferential direction of the foreign substance discharging groove shown in FIG. 2.

Furthermore, as shown in FIG. 5, a range β in a circumferential direction in which both foreign substance discharging grooves 5 and 5' are provided is preferably set to within a range of 25° before and after the inner circumferential edge 4 when no crush relief (notch) is set in the sliding bearing 1. On the other hand, when a crush relief is set in the sliding bearing 1, the foreign substance discharging grooves 5 and 5' are preferably formed within crush relief regions A1 and A2 (see FIG. 2).

Furthermore, as shown in FIG. 4, the angles of inclination of the both foreign substance discharging grooves 5 and 5' with respect to the axial direction of the sliding bearing 1 are set to 30°. In FIG. 4, the angles of inclination are displayed as angles formed between the peripheral edge 4 and the foreign substance discharging grooves 5 and 5' on the assumption that the inner circumferential edge 4 of the abutting surfaces 11A and 12A is parallel to the axial direction of the sliding bearing 1.

Furthermore, the central part 4A of the inner circumferential edge 4 in the axial direction in the sliding bearing 1 is located on the moving track of the distal end of the lubricant supply hole 2A when the crank pin 2 rotates. Therefore, when the crank pin 2 rotates in the direction indicated by the arrow, the lubricant is directly supplied to the central part 4A of the inner circumferential edge 4 which is a point of intersection between both foreign substance discharging grooves 5 and 5' via the lubricant supply hole 2A. When the foreign substance 6 is mixed in the supplied lubricant, the foreign substance 6 is trapped by any one of the foreign substance discharging grooves 5 and 5' (see FIG. 3).

With the sliding bearing 1 configured as shown above, when the crank pin 2 is rotated in the arrow direction in FIG. 1, the lubricant is also directly supplied to the foreign substance discharging grooves 5 and 5' from the lubricant supply hole 2A, and the lubricant is then discharged out of both end faces 7 and 8 via the foreign substance discharging grooves 5 and 5'.

Figure 3:
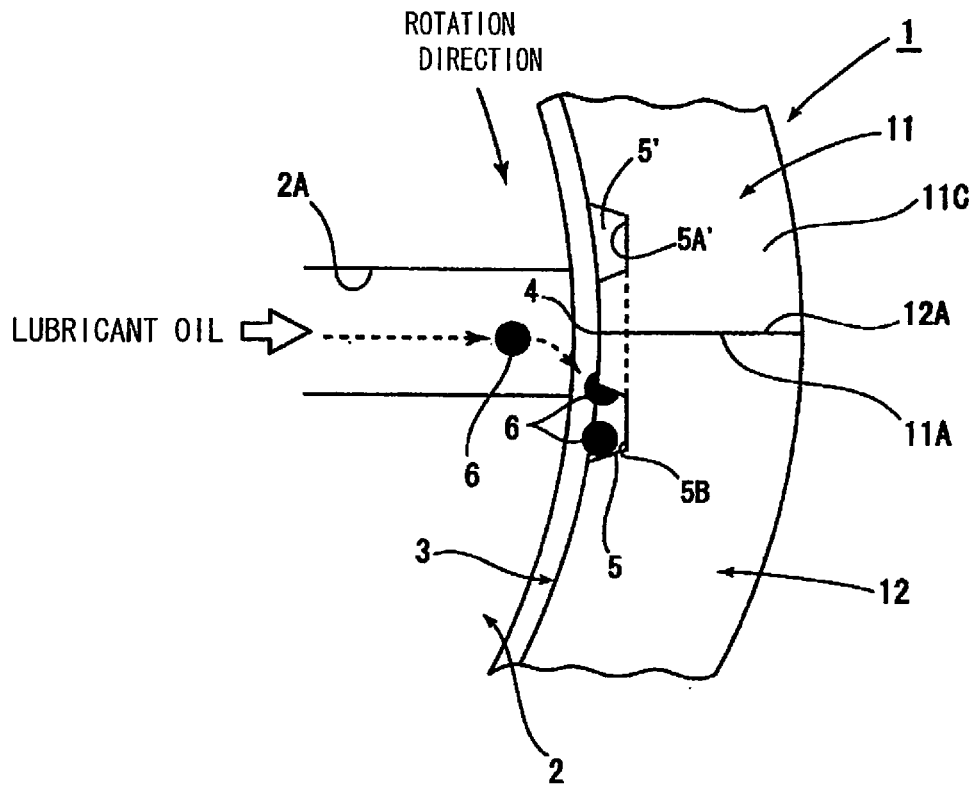
FIG. 3 is a schematic view illustrating a state in which a lubricant containing a foreign substance is supplied to the main parts in FIG. 1.

When the lubricant is supplied in this way, if the foreign substance 6 is included in the lubricant as shown in the schematic view in FIG. 3, the foreign substance 6 is trapped at the point of intersection of both foreign substance discharging grooves 5 and 5', passes through one of the foreign substance discharging grooves 5 and 5' and is discharged out of the sliding bearing 1 from the end 5A or 5B (5A' or 5B') open to the end face 7 or 8. In this case, since both foreign substance discharging grooves 5 and 5' are provided inclined with respect to the axial direction of the sliding bearing 1, a downward flow of the lubricant is generated in the foreign substance discharging grooves 5 and 5'. Thus, the foreign substance 6 in the foreign substance discharging grooves 5 and 5' is guided by the side walls 5C and 5C inclined with respect to the axial direction as the crank pin 2 rotates and is speedily and efficiently discharged out of the sliding bearing 1.

Therefore, the present embodiment can provide a sliding bearing 1 having better foreign substance discharging characteristics compared with the prior arts.

Figure 8:
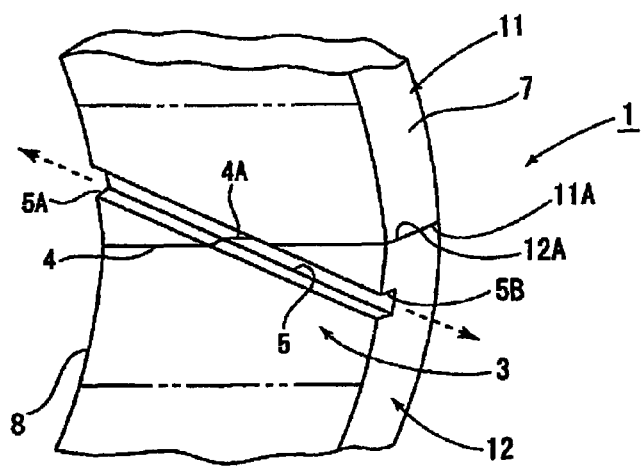
FIG. 8 is a perspective view of main parts illustrating a second embodiment of the present invention.

Next, FIG. 8 shows a second embodiment of the present invention and this second embodiment omits one foreign substance discharging groove 5' in the first embodiment and provides only the other foreign substance discharging groove 5 on the sliding surface 3. The rest of the configuration is the same as that of the first embodiment and components corresponding to those in the first embodiment are assigned the same reference numerals.

Such a second embodiment can also obtain operations and effects similar to those in the aforementioned first embodiment.

Figure 9:
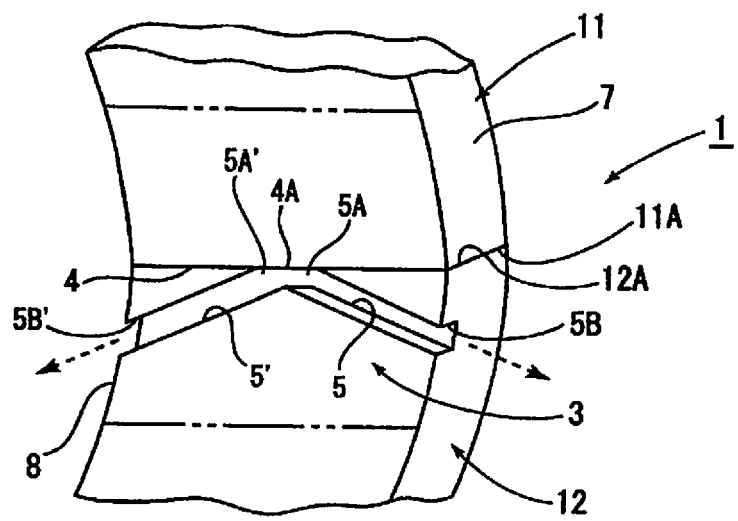
FIG. 9 is a perspective view of main parts illustrating a third embodiment of the present invention.

Next, FIG. 9 shows a third embodiment of the present invention and this third embodiment omits the groove of the sliding surface 3 above the inner circumferential edge 4 in the foreign substance discharging grooves 5 and 5' of the first embodiment and provides a rectilinear groove below the inner circumferential edge 4 on the sliding surface 3. That is, the first foreign substance discharging groove 5 is formed from the central part 4A of the inner circumferential edge 4 in the axial direction to the one end face 7, and the second foreign substance discharging groove 5' is formed from the central part 4A of the inner circumferential edge in the axial direction to the other end face 8. Ends 5A and 5A' of both foreign substance discharging grooves 5 and 5' communicate with each other at the central part 4A of the inner circumferential edge 4 in the axial direction, the other end of the first foreign substance discharging groove 5 is open to the end face 7 of the lower half-bearing 12 and the other end of the second foreign substance discharging groove 5' is open to the end face 8 of the lower half-bearing 12.

The rest of the configuration is the same as that of the first embodiment and components corresponding to those in the first embodiment are assigned the same reference numerals. Such a third embodiment can also obtain operations and effects similar to those in the aforementioned first embodiment.

Figure 10:
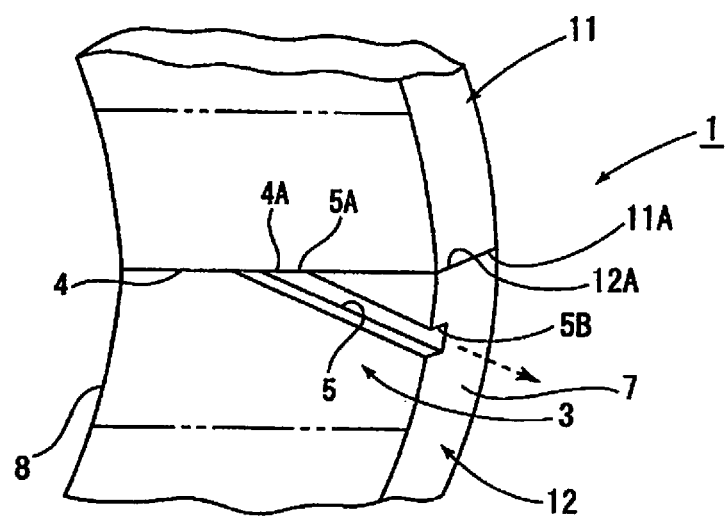
FIG. 10 is a perspective view of main parts illustrating a fourth embodiment of the present invention.

Next, FIG. 10 shows a fourth embodiment of the present invention and this fourth embodiment omits the one foreign substance discharging groove 5' in the third embodiment in FIG. 9 and provides a single foreign substance discharging groove 5 on the sliding surface 3 of the lower half-bearing 12. That is, in this fourth embodiment, the foreign substance discharging groove 5 is formed from the central part 4A of the inner circumferential edge 4 in the axial direction to the end face 7. The rest of the configuration is the same as that of the first embodiment. Such a fourth embodiment can also obtain operations and effects similar to those in the aforementioned first embodiment.

Figure 11:
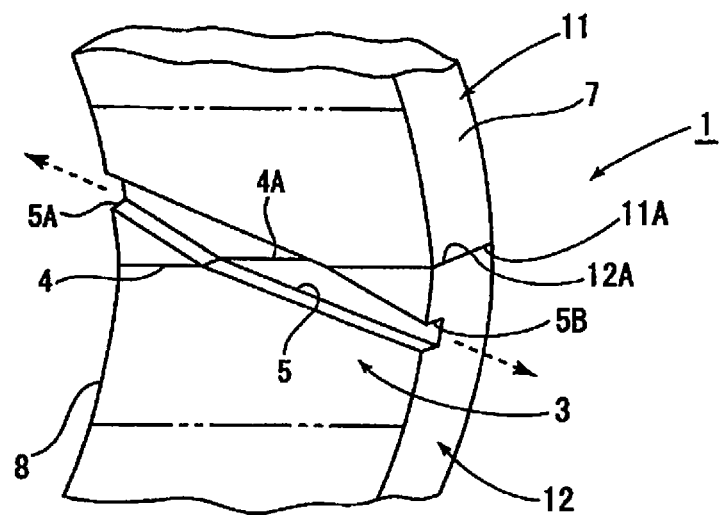
FIG. 11 is a perspective view of main parts illustrating a fifth embodiment of the present invention.

Next, FIG. 11 shows a fifth embodiment of the present invention and in this fifth embodiment, the foreign substance discharging groove 5 at the central part 4A of the inner circumferential edge 4 has a greater width than the width of the ends 5A and 5B in the second embodiment shown in FIG. 8. To be more specific, the width of the foreign substance discharging groove 5 at the central part 4A is approximately 1.5 times that of the foreign substance discharging groove 5 at the ends 5A and 5B and the width of the foreign substance discharging groove 5 gradually decreases from the position of the central part 4A toward both ends 5A and 5B. In the above-described first embodiment to this fifth embodiment, the foreign substance discharging groove 5 (5') is set to the same depth over the entire area.

The rest of the configuration is the same as that of the second embodiment shown in FIG. 8. Such a fifth embodiment can also obtain operations and effects similar to those in the aforementioned embodiments.

Figure 12:
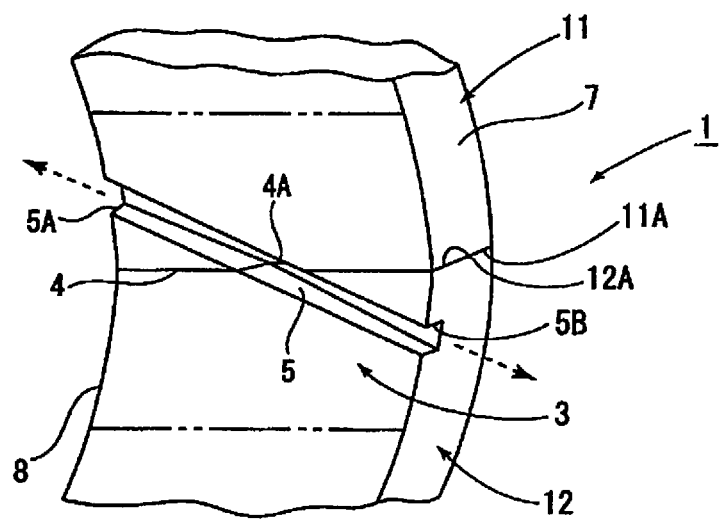
FIG. 12 is a perspective view of main parts illustrating a sixth embodiment of the present invention.

Next, FIG. 12 shows a sixth embodiment of the present invention and in this sixth embodiment, the depth of the foreign substance discharging groove 5 at the central part 4A of the inner circumferential edge 4 is greater than the depth at the ends 5A and 5B in the second embodiment shown in FIG. 8. To be more specific, the depth of the foreign substance discharging groove 5 at the central part 4A is approximately 1.5 times the depth of the foreign substance discharging groove 5 at the ends 5A and 5B and the depth of the foreign substance discharging groove 5 gradually decreases from the position of the central part 4A toward the ends 5A and 5B. In this sixth embodiment, the foreign substance discharging groove 5 is set to the same width throughout the entire area.

The rest of the configuration is the same as that of the second embodiment shown in FIG. 8. Such a sixth embodiment can also obtain operations and effects similar to those in the aforementioned embodiments.

Though not shown, the aforementioned fifth embodiment and sixth embodiment may be combined, that is, in the second embodiment shown in FIG. 8, the width of the foreign substance discharging groove 5 at the central part 4A of the inner circumferential edge 4 may be greater than that at the ends 5A and 5B and the depth may be greater than at the ends 5A and 5B.

Figure 13:
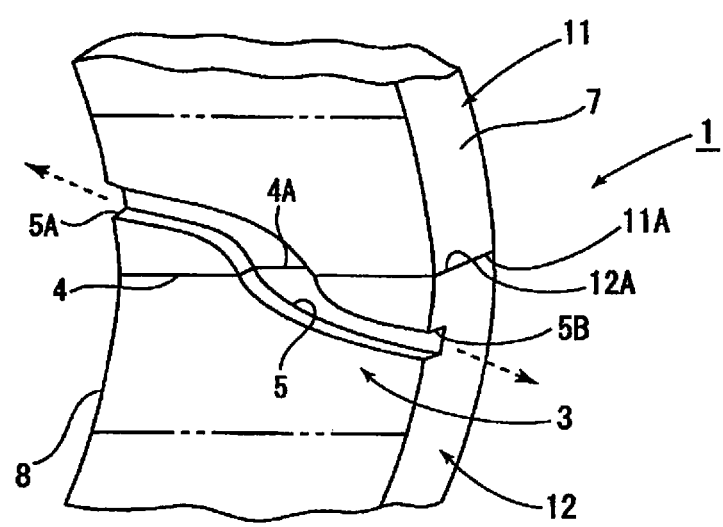
FIG. 13 is a perspective view of main parts illustrating a seventh embodiment of the present invention.

Next, FIG. 13 shows a seventh embodiment of the present invention, and this seventh embodiment provides a curved foreign substance discharging groove 5 instead of the rectilinear foreign substance discharging groove 5 in the second embodiment in FIG. 8 above and the width of the foreign substance discharging groove 5 at the central part 4A of the inner circumferential edge 4 is greater than that at the ends 5A and 5B. In this seventh embodiment, the foreign substance discharging groove 5 is set to the same depth throughout the entire area.

The rest of the configuration is the same as that of the second embodiment shown in FIG. 8. Such a seventh embodiment can also obtain operations and effects similar to those in the aforementioned embodiments.

Cases have been described in the aforementioned embodiments where the foreign substance discharging groove 5 (5') is provided in the sliding bearing 1 with no crush relief on the sliding surface 3 adjacent to the inner circumferential edge 4 of the abutting surfaces 11A and 12B, but it goes without saying that the foreign substance discharging groove 5 (5') shown in the aforementioned embodiments may also be provided on the sliding bearing 1 with a crush relief on the sliding surface 3 adjacent to the inner circumferential edge 4 of the abutting surfaces 11A and 12B.

Furthermore, although the above-described embodiments do not particularly refer to the chamfer part of the inner circumferential edge 4 of the abutting surfaces 11A and 12B, the foreign substance discharging grooves 5 and 5' of the aforementioned present embodiments can be formed on the sliding surface 3 of the sliding bearing 1 irrespective of whether or not the chamfer part is formed at the inner circumferential edge 4 of the abutting surfaces 11A and 12B.

When the chamfer part is formed at the inner circumferential edge 4, the foreign substance discharging groove 5 (5') sufficiently secures the discharging path of the foreign substance, and therefore minimizing the amount of chamfering of the sliding bearing 1 is considered preferable from the standpoint of securing a hydraulic pressure of the engine.

Furthermore, a case has been described in the aforementioned embodiments where the foreign substance discharging groove 5 (5') is provided at the location of the inner circumferential edge 4 on one side (right side) in FIG. 1, but it goes without saying that the same foreign substance discharging groove 5 (5') as that in the aforementioned embodiments may also be provided at the inner circumferential edge 4 on the other side (left side) in FIG. 1. However, in that case, it is important to set the foreign substance discharging groove (5') on the other side (left side) so that the same setting as that on one side (right side) in aforementioned FIG. 1 is set with respect to the rotation direction of the axis of rotation.

REFERENCE SIGNS LIST 1 sliding bearing
2 crank pin (axis of rotation)
3 sliding surface
4 inner circumferential edge
5, 5' foreign substance discharging groove
6 foreign substance
7, 8 end face
11 half-bearing
11A abutting surface
12 half-bearing
12A abutting surface

The invention claimed is:

1. A sliding bearing formed into a cylindrical shape by placing abutting surfaces of an upper half-bearing and a lower half-bearing so as to abut against each other and rotatably support an axis of rotation by a sliding surface made of inner surfaces of both half-bearings,
wherein a foreign substance discharging groove, an end of which is open to at least one of end faces in an axial direction, is formed on the sliding surface adjacent to an inner circumferential edge of the abutting surface of at least one of the upper and lower half-bearings by being tilted with respect to the axial direction of the sliding bearing, a crush relief made up of a notch is formed on the sliding surface adjacent to the inner circumferential edge and the foreign substance discharging groove is provided within an area in which the crush relief is formed.

2. The sliding bearing according to claim 1,
wherein the foreign substance discharging groove comprises a rectilinear first foreign substance discharging groove and a rectilinear second foreign substance discharging groove that cross each other,
the first foreign substance discharging groove crosses a central part of the inner circumferential edge in the axial direction and is provided so that both ends are open to one end face and the other end face of the sliding bearing in the axial direction, and
the second foreign substance discharging groove crosses the first foreign substance discharging groove at the central part of the inner circumferential edge in the axial direction and both ends are open to one end face and the other end face of the sliding bearing in the axial direction.

3. The sliding bearing according to claim 1, wherein the foreign substance discharging groove crosses a central part of the inner circumferential edge in the axial direction and comprises a rectilinear groove provided so that both ends thereof are open to one end face and the other end face of the sliding bearing in the axial direction.

4. The sliding bearing according to claim 3, wherein the width of the groove in the foreign substance discharging groove at the central part of the inner circumferential edge is greater than the width of the groove at the ends open to both end faces.

5. The sliding bearing according to claim 1,
wherein the foreign substance discharging groove comprises a first foreign substance discharging groove and a second foreign substance discharging groove formed on the half-bearing on the downstream side of the axis of rotation in the rotation direction,
one end of the first foreign substance discharging groove is connected to a central part of the inner circumferential edge in the axial direction and the other end comprises a rectilinear groove that is open to one end face in the axial direction,
one end of the second foreign substance discharging groove is connected to the central part of the inner circumferential edge in the axial direction and the other end comprises a rectilinear groove that is open to the other end face in the axial direction, and
the first foreign substance discharging groove and the second foreign substance discharging groove communicate with each other.

6. The sliding bearing according to claim 1,
wherein the foreign substance discharging groove comprises a rectilinear groove formed in the half-bearing on a downstream side of the axis of rotation in the rotation direction,
one end of the foreign substance discharging groove is connected to a central part of the inner circumferential edge in the axial direction and the other end is open to one end face in the axial direction.

7. The sliding bearing according to claim 1, wherein the foreign substance discharging groove crosses a central part of the inner circumferential edge in the axial direction and comprises a curved groove provided so that both ends thereof are open to one end face and the other end face in the axial direction.

8. The sliding bearing according to claim 1, wherein the foreign substance discharging groove is formed on the sliding surface adjacent to the inner circumferential edge within a range of 25° in a circumferential direction.

9. A sliding bearing formed into a cylindrical shape by placing abutting surfaces of an upper half-bearing and a lower half-bearing so as to abut against each other and rotatably support an axis of rotation by a sliding surface made of inner surfaces of both half-bearings, wherein a foreign substance discharging groove, an end of which is open to at least one of end faces in an axial direction, is formed on the sliding surface adjacent to an inner circumferential edge of the abutting surface of at least one of the upper and lower half-bearings by being tilted with respect to the axial direction of the sliding bearing and the depth of the groove in the foreign substance discharging groove at a central part of the inner circumferential edge is greater than the depth of the groove at the ends open to both end faces.

* * * * *